(12) United States Patent
Dighton et al.

(10) Patent No.: US 9,370,213 B1
(45) Date of Patent: Jun. 21, 2016

(54) BUTTON AND FASTENER COVER

(71) Applicants: Jessica Brooke Dighton, Orlando, FL (US); Anthony John Dighton, Orlando, FL (US)

(72) Inventors: Jessica Brooke Dighton, Orlando, FL (US); Anthony John Dighton, Orlando, FL (US)

( * ) Notice: Subject to any disclaimer, the term of this patent is extended or adjusted under 35 U.S.C. 154(b) by 32 days.

(21) Appl. No.: 13/573,815

(22) Filed: Oct. 9, 2012

(51) Int. Cl.
*A41F 17/02* (2006.01)
*F16B 2/22* (2006.01)

(52) U.S. Cl.
CPC . *A41F 17/02* (2013.01); *F16B 2/22* (2013.01); Y10T 24/44983 (2015.01)

(58) Field of Classification Search
CPC .............. B42F 1/02; B42F 1/04; B42F 1/06; B42F 1/10; D06F 55/00; F16B 2/22; F16B 2/24; F16B 2/241; Y10T 24/15; Y10T 24/44983; Y10T 24/44991; Y10T 24/44769; A41F 17/02
USPC .......... 24/3.12, 545, 561, 563, 547, 555, 557, 24/546, 556, 293, 297, 306, 3.11, 72.1, 24/67.9, 67.11; D8/395; D11/78.1; 411/174; 248/316.7; 132/276, 277, 132/280, 284; D28/39
See application file for complete search history.

(56) References Cited

U.S. PATENT DOCUMENTS

| | | | | | |
|---|---|---|---|---|---|
| 831,445 | A | * | 9/1906 | Kosmatka | 24/563 |
| 1,148,934 | A | * | 8/1915 | Shuey | 24/563 |
| 1,589,228 | A | * | 6/1926 | Robb | 24/532 |
| 1,857,488 | A | * | 5/1932 | Weeks | 24/563 |
| 2,438,645 | A | * | 3/1948 | Palagonia | 24/331 |
| 2,795,233 | A | * | 6/1957 | Zore | A45D 8/14 132/276 |
| 3,182,368 | A | * | 5/1965 | Fair | 24/347 |
| 3,561,066 | A | * | 2/1971 | Osteen | 24/3.12 |
| 3,947,925 | A | | 4/1976 | Hargrave | |
| 4,947,524 | A | * | 8/1990 | Chang | 24/67.9 |
| 6,188,881 | B1 | | 2/2001 | Braxton | |
| 6,286,736 | B1 | | 9/2001 | Angus et al. | |
| 6,842,949 | B2 | * | 1/2005 | Warren | 24/135 N |
| 6,857,167 | B2 | | 2/2005 | Bishop | |
| D581,311 | S | * | 11/2008 | Cornett | D11/78.1 |
| 7,806,069 | B2 | | 10/2010 | Bryant et al. | |
| 1,300,188 | A1 | | 4/2014 | Dighton et al. | |
| 2010/0319722 | A1 | * | 12/2010 | Hsu | A45D 8/14 132/276 |

* cited by examiner

*Primary Examiner* — Abigail Morrell
(74) *Attorney, Agent, or Firm* — Mitchell J. Mehlman, Esq.

(57) ABSTRACT

A multi-purpose flexible clip for gripping a medium to which it is affixed consisting of a thin, one-piece high density material shaped in a rectangle having a front facing side and being folded over to form a backside thereby creating a resistant clip, said backside having two holes formed therein for access to said medium for gripping said medium for removal from said medium.

1 Claim, 2 Drawing Sheets

BUTTON AND FASTENER COVER

FIELD OF THE INVENTION

The present invention relates to a flexible clipping device that is used to protect a user's clothing top from a user's clothing bottom in particular, and as a functional fashion accessory in general.

BACKGROUND OF THE INVENTION

Tight or well fitted clothing tops that run below the waist or which that are untucked, are commonly worn by everyday men, women and children and are especially popular in today's fashion trends. Due to this style, the appearance of small holes, or wear, in the midsection of one's tops such as their shirt, sweater, blouse, etc. are a common occurrence. This is caused by the user's button and/or the fabric that protrudes next to the button on their clothing bottoms such as jeans, pants, skirts, etc. Even the use of a belt will not prevent these bothersome holes, but instead can add to the problem. Many times these nuisance holes will appear after a single wear, which ruins the overall appearance of one's top. Because of this phenomenon there exists a need to protect the user's top from the users' bottom. In addition, there are many web page blogs and even a dedicated Facebook page that discusses these annoying holes.

There exist numerous types of edge clips, most of which are made of a metal wire of round cross-section and with some degree of resiliency is bent into various shapes. One such device is shown in U.S. Pat. No. 7,806,069 to Bryant et al. which discloses a system for securing a flexible cover to a boat. Am edge clip is adjustably disposed on the flexible member.

U.S. Pat. No. 6,857,167 to Bishop discloses a necktie restraining device having two flexibly connected covers. The first cover is placed on the shirt button located above the necktie label on a necktie panel. The second cover and flexible connector are dropped through the opening between the necktie label and the front. The second button cover is then placed on the shirt button located below the necktie label. U.S. Pat. No. 6,286,736 to Angus et al. discloses a container detachably securable to an article of clothing or other item. The container includes a first panel and a second panel. The first and second panels are attached at their peripheral edges to form a pouch with an opening thereto.

SUMMARY OF THE INVENTION

Accordingly, an object of the instant invention is to provide a one piece detachable pants clip to pin over the top of two pieces of fabric that are already buttoned or fastened. The flexible clipping device will entirely cover the area where any type of button or fastener is already used to adjoin the two pieces of fabric.

The flexible clip generally has a rectangular shape with round edges and is comprised of a thin, flat, resilient material to effectively slide over the overlapped, fastened fabrics while maintaining a tight grip to secure itself into its stationary position. The main function of the present invention is that it will protect one's shirt from holes, which will allow the clothing to remain in good condition, which in return will reduce replacement costs.

Another benefit, when the invention is being used as previously described, will provide a flat, sleek appearance to deter attention to one's midsection unlike that of a bulky like belt or when not using said invention.

To provide a fashionable aspect to the invention, the clip could take on other shapes such as a heart, circle, oval, square, etc. In addition, these constructed various shapes may also come in various colors and display various artwork, logos, brand names, engravings, icons and sports teams. The subject invention can take on various aesthetic displays, which may or may not defeat its main function, but is entirely decided upon the user and their intent of wearing such invention.

DESCRIPTION OF THE PREFERRED EMBODIMENT

Figure 1:
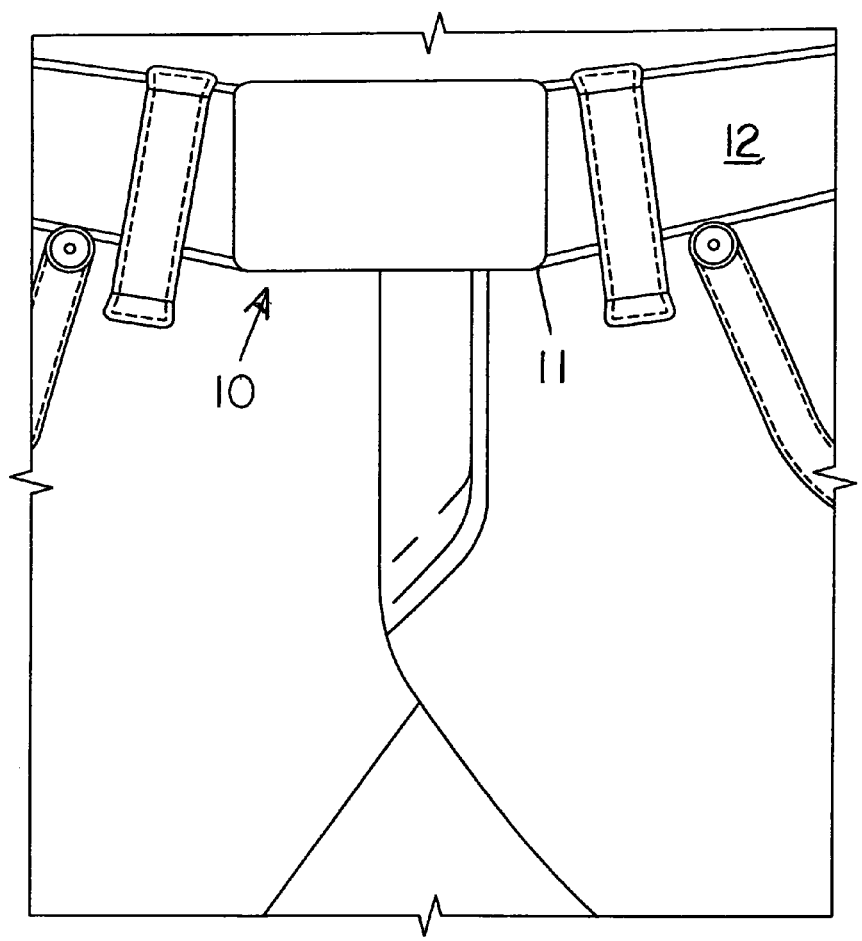
FIG. 1 is a front perspective view or plain view of the invention without aesthetic display.
Figure 2:
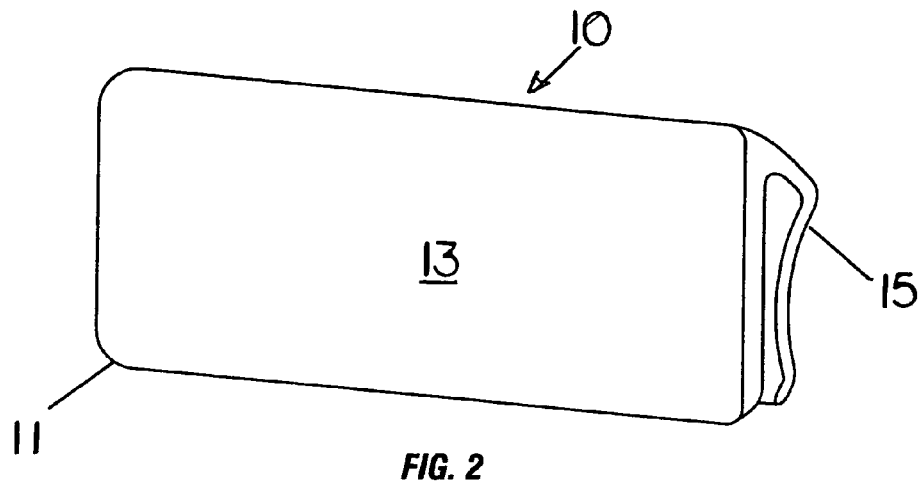
FIG. 2 is a front perspective view of the invention showing a partial view of its side.
Figure 3:
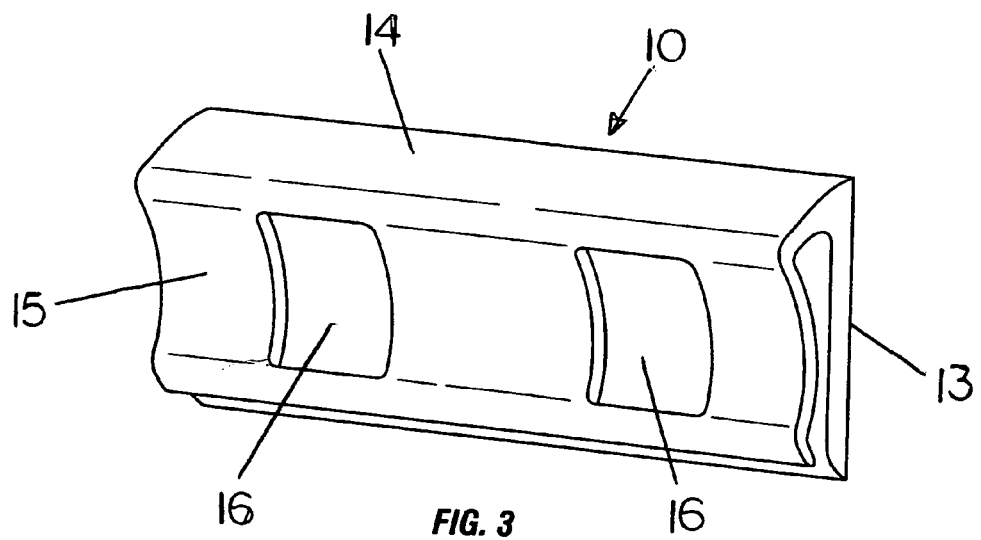
FIG. 3 is a rear perspective view of the invention.

FIG. 1 shows the first embodiment of the button and fastener cover 10 which consists of a thin, one-piece, high density material shaped in a rectangle with rounded edges 11 so that it cannot cut the fabric 12. The material can range in size, as long as it holds its main purpose but in the instant invention it is roughly 3 inches long by 2 inches wide, The front facing side 13 of the rectangle is blank and in solid color. The top 14 of the front facing side 13 is rolled or folded over itself to form the backside 15 thus creating a resistant clip used to hold both fabrics together.

Similar to that of a money clip, there will be two holes 16 rather than one on the rear side, so that the thumbs of the user may slide the cover 10 off the pinched fabrics.

Although I have described a specific embodiment of my invention, it is apparent that modifications thereof may be made by those skilled in the art. Such modifications may be made without departing from the spirit and scope of my invention as set forth in the appended claims.

What is claimed is:

1. A button and fastener cover comprising:
   (a) a front member, said front member being substantially flat and rectangular, said front member including a plurality of rounded corners and a solid continuous surface;
   (b) a rear member, said rear member having a proximal concave portion and a distal linear portion, said concave portion being curved in a direction towards said front member, said linear portion being bent at an angle in a direction towards said front member thereby forming a continuous aperture between said front member and said rear member, wherein said front member is configured so that said rear member cannot move beyond or through said solid continuous surface of said front member; and
   (c) a top member, said top member connecting said front member to said proximal concave portion of said rear member, thereby forming a flexible hinge for removeably gripping a pair of pants having a button or fastener between said solid continuous surface of said front member, said rear member, and said top member, and protecting a garment from abrasion against said button or fastener.

* * * * *